United States Patent [19]

Renner

[11] Patent Number: 4,532,624
[45] Date of Patent: Jul. 30, 1985

[54] PARITY CHECKING ARRANGEMENT FOR A REMOTE SWITCHING UNIT NETWORK

[75] Inventor: Robert E. Renner, Glendale, Ariz.

[73] Assignee: GTE Automatic Electric Inc., Northlake, Ill.

[21] Appl. No.: 548,482

[22] Filed: Nov. 3, 1983

[51] Int. Cl.³ .......................... H04Q 11/04; H04J 3/14
[52] U.S. Cl. .......................................... 370/13; 370/63
[58] Field of Search .................... 370/63, 64, 58, 59, 370/13

[56] References Cited

U.S. PATENT DOCUMENTS

| | | | |
|---|---|---|---|
| 4,178,479 | 12/1979 | McDonald et al. | 370/59 |
| 4,393,490 | 7/1983 | Culley | 370/63 |
| 4,399,369 | 8/1983 | Simmons et al. | 370/58 |
| 4,480,330 | 10/1984 | Magnusson et al. | 370/63 |

OTHER PUBLICATIONS

"GTD-5EAX-Digital Remote Units" by Puccini et al. in NTG-Fachber (Germany), vol. 73, 1980, pp. 212-216.
"GTD-5EAX A Family of Digital Switches" by Esperseth in GTE Automatic Electric Journal, Sep. 1979, pp. 150-154.
"Adaptation of the GTD-5EAX for International Applications" by Czarnecki et al. in GTE Automatic Electric Journal, Sep.-Oct. 1981, pp. 156-163.

Primary Examiner—Douglas W. Olms
Attorney, Agent, or Firm—Frank J. Bogacz; Peter Xiarhos

[57] ABSTRACT

Circuitry for validating the integrity of PCM data transmitted through a digital switching network is shown. The space stage of the switching system requires that appropriate data validity be maintained throughout. A parity scheme is employed to fulfill this requirement. For detection of invalid parity, an alarm notification is sent to the central processing unit (CPU) of the switching system. The CPU may then interrogate the space switching circuitry to determine the particular location of the parity failure. In addition, the circuitry provides for a testing feature, such that, the operation of the parity checking circuits may be validated.

31 Claims, 7 Drawing Figures

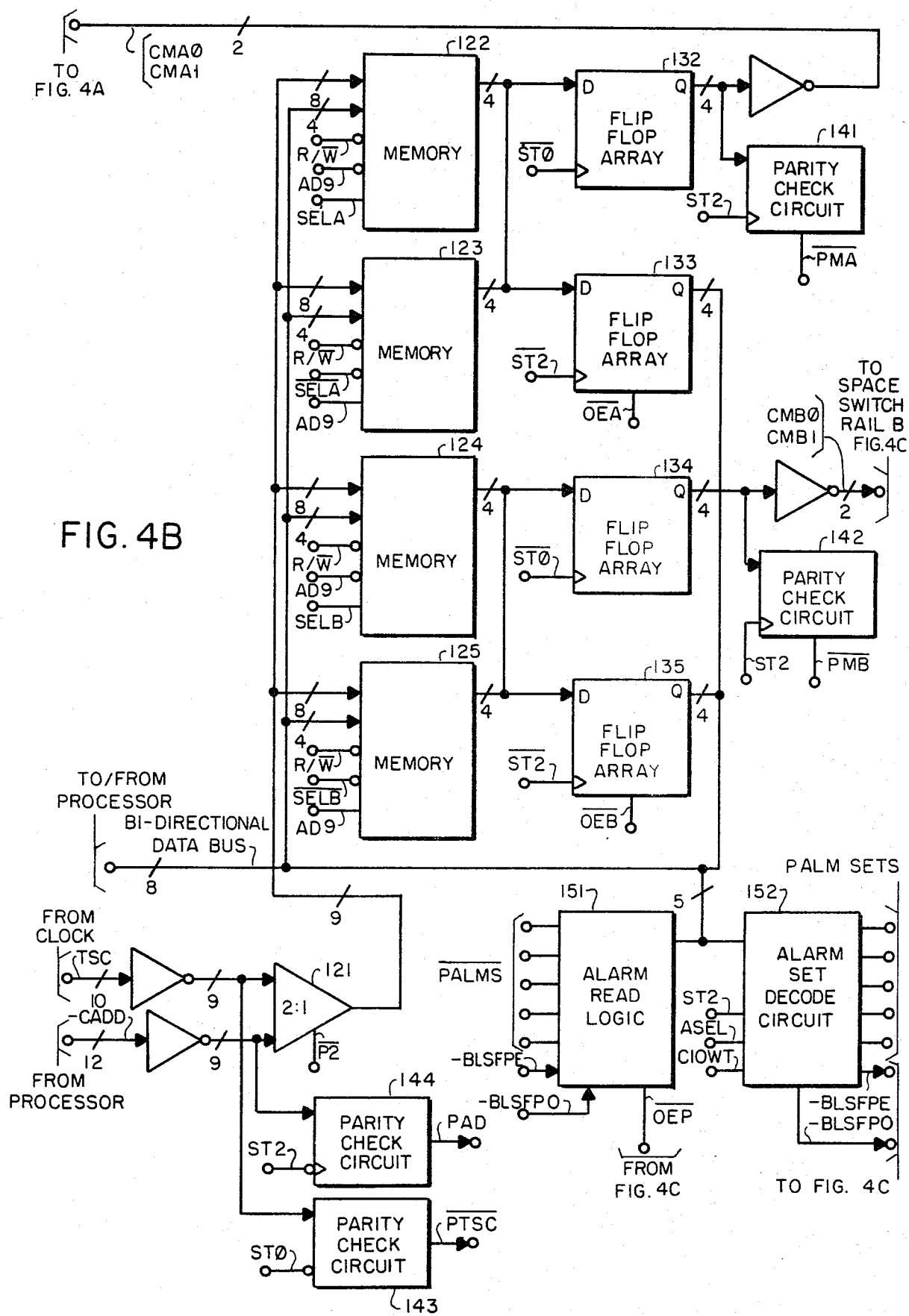

PARITY CHECKING ARRANGEMENT FOR A REMOTE SWITCHING UNIT NETWORK

CROSS-REFERENCE TO RELATED APPLICATIONS

The present application is related to U.S. patent application Ser. Nos. 548,483; 548,481; and, 548,484, all having the same inventive entity and being assigned to the same assignee as the present invention.

BACKGROUND OF THE INVENTION

The present invention pertains to digital communication switching systems and more particularly to a data validity checking arrangement for the space switching stage of a time division multiplexing switching system.

In PCM communication switching systems, data, such as speakers' voices, is represented digitally. That is, speech samples are represented by a group of bits. Loss of any of these bits can significantly affect the voice sample. As a result, a method for ensuring the integrity of transmitted data is required.

Parity schemes may be utilized to detect and maintain data integrity. By using a parity scheme, it can be determined whether bits have become lost during transmission or whether bits are stuck at a particular logic 0 or logic 1 value. Two types of parity schemes exist, odd and even. In an odd parity scheme, the value of the parity bit would be a logic 1 if an even number of data bits have a value of logic 1. The value of the parity bit would be logic 0 if the value of an odd number of data bits have the value logic 1. In an even parity situation, the opposite would be true.

One such parity scheme is shown for a time division switching system employing PCM data transmission by U.S. Pat. No. 4,160,127, issued to M. F. Slana, on July 30, 1979. This patent teaches the use of a parity generation and detection process. Parity is generated before data enters a particular functional block and parity is checked after the data emerges from that functional block.

This kind of validity checking arrangement is inefficient since parity must be generated a number of times. In addition, each of the parity generating circuits is itself susceptible to faults. As a result, this configuration maximizes the chances for generating erroneous parity.

Accordingly, it is the object of the present invention to provide a data validity checking arrangement which actively transmits parity along with PCM data samples through the space switching stage of a digital switching system in an efficient manner to minimize faults.

SUMMARY OF THE INVENTION

In a telecommunications system, a parity checking arrangement for a remote switching unit, which is connected between subscribers and other switching systems, is shown. The connection of the subscribers to the remote switching unit is established via a plurality of interface equipment. The parity checking arrangement for a remote switching unit includes first and second PCM buses which are connected to the subscribers via the interface equipment. These buses provide for transmitting a plurality of PCM samples, which include a parity bit, between the remote switching unit and the subscribers. The parity checking arrangement also includes third and fourth PCM buses which connect the remote switching unit with other switching systems through the interface equipment. The third and fourth buses provide for transmitting a plurality of PCM samples, which also include a parity bit, between the remote switching unit and the other switching systems.

Digital spans are connected between the plurality of interface equipment and the other switching systems. The digital spans transmit PCM data between the interface equipment of the remote switching unit and the other switching systems.

The parity checking arrangement also includes first and second originating time switches. These time switches are operated to switch the PCM samples with parity from the interface equipment. The first and second time switches are connected to the interface equipment via the first and second PCM buses respectively.

The parity checking arrangement also includes first and second space switches. The first and second space switches each include a first set of latches, which are connected to the corresponding first and second originating time switches. These latches operate in response to the transmitted PCM samples with parity to store the samples during each time slot. Each space switch also includes a multiplexer, which is connected to the first set of latches. The multiplexer transmits the stored PCM samples during each time slot in response to two operating signals of a first predefined value.

The space switches also each include a second set of latches, which are connected to the multiplexer. The second set of latches is operated to store PCM samples transmitted through the multiplexer during each time slot. In addition, a selector is connected to the multiplexer, to the first set of latches and to the interface equipment via third and fourth PCM buses. The selector receives and transmits the PCM data samples with parity from the other switching systems during each time slot. The multiplexer also operates in response to the received PCM samples with parity from the other switching systems, to transmit these samples during time slots in response to the operating signals of second predefined values. The selector also operates in response to the stored PCM samples of the first set of latches, to transmit the samples to the interface equipment via the third and fourth PCM buses. These PCM samples are then retransmitted through the digital spans.

Each of the space switches further includes a parity checking circuit which is connected between the first set of latches and the multiplexer. The parity checking circuit is also connected between the multiplexer and the second set of latches. The parity checking circuit operates in response to the transmitted PCM samples having parity bits to determine whether the included parity bit is a correct value. In addition, the parity checking circuit operates to generate a number of bad parity signals for a detection of an incorrect parity bit of any PCM sample. These bad parity signals indicate the location at which the bad parity was detected. Lastly, the parity checking circuit operates to store the PCM sample having an incorrect parity bit.

The parity checking arrangement lastly includes first and second terminating time switches. These switches are connected respectively between the first and second space switches via the second set of latches. The first and second terminating time switches are also connected to the interface equipment. The terminating time switches operate respectively to switch PCM samples with parity from the first and second space switches to the interface equipment for retransmission of the PCM samples to the subscribers.

BRIEF DESCRIPTION OF THE DRAWINGS

FIG. 4B is a schematic diagram of another portion of the space switch rail A and control A and B of FIG. 3. FIGS. 4A and 4B taken collectively from the space switch rail A and control A and B as shown in FIG. 3.

DESCRIPTION OF THE PREFERRED EMBODIMENT

Figure 1:
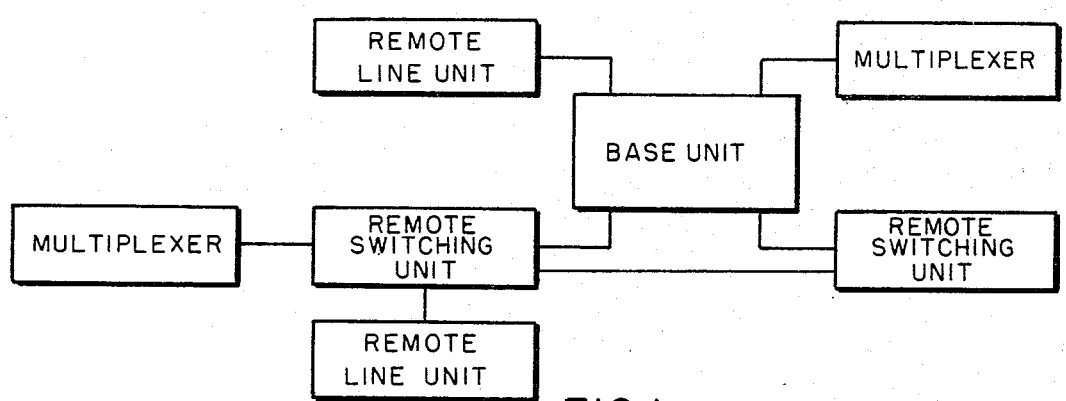
FIG. 1 is a block diagram of configurations of switching units of the switching system of the present invention.

Referring to FIG. 1, the GTD-5 EAX system is shown. The GTD-5 EAX is designed and manufactured by GTE Automatic Electric Incorporated. The GTD-5 EAX system is a family of stored program control telephone digital switching units intended to provide class 5 and class 4/5 switching service, spanning office sizes between 500 and 150,000 lines. The base unit of the GTD-5 EAX provides for interfacing the three other types of remote units to the telephone network.

These remote units are a remote switching unit (RSU), a remote line unit (RLU) and a multiplexer unit (MXU). The base unit (BU) is provided in two versions, a large base unit (LBU) and a small base unit (SBU). The LBU has a capacity of between 2,000 to 150,000 lines providing up to 360,000 call attempts per hour and 300,000 directory numbers. The LBU hosts all three types of remote units which are interconnected via digital facilities, such as T1 spans.

The SBU has identical features to the LBU with the exception that class 4C operation is not provided. Its capacity is in the range of 500 to 20,000 lines and provides for 65,000 call attempts per hour and up to 40,000 directory numbers.

The RSU is a small switching system designed to serve outlying communities of up to 3,000 lines. Although the RSU is controlled by the BU, it provides local to local switching service. The RSU is interconnected to the base unit via between 2 to 32 digital links, such as T1 spans. An RSU also provides the capability of hosting RLUs or MXUs. When interconnected by specific links, two co-located RSUs will function as an integral unit, thus extending service up to 6,000 lines.

The RLU is a concentrating pair gain unit serving up to 768 lines. The RLU interconnects to the host unit via between 2 to 8 digital links.

The MXU is a concentrating or a non-concentrating pair gain unit serving up to 96 lines. It is designed for either pedestal or pad mounting in the outside plant and it interconnects to the host unit via between 1 to 4 digital links.

Figure 2:
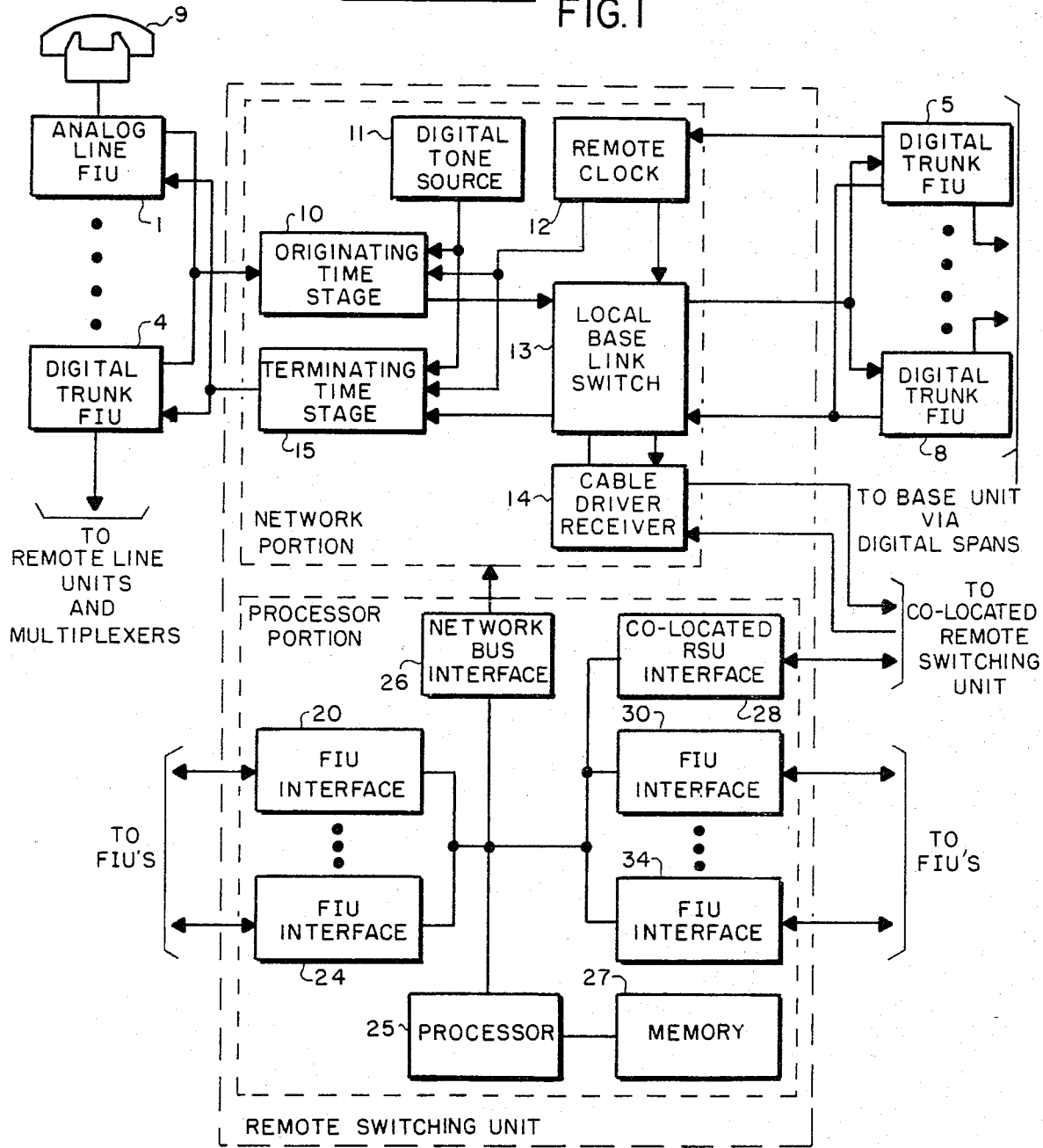
FIG. 2 is a block diagram of the remote switching unit of FIG. 1.

Shown in FIG. 2 is a block diagram of the remote switching unit (RSU). The RSU is divided into two portions—a network portion and a processor portion.

Analog line facility interface units (FIU) and digital trunk FIUs interface the RSU to subscribers or to other switching units, respectively.

Each of the analog FIUs convert the incoming analog voice signals to PCM signals for transmission through the network The sampling rate of an FIU is 8,000 samples per second or 1 sample every 125 microseconds. The analog FIU has a capacity of 193 channels. Each time frame is 125 microseconds in duration and there are 193 time slots per time frame. One FIU time slot is 648 nanoseconds in duration.

The network of the RSU is 12 bits wide. Each PCM sample comprises 8 bits of these 12 bits and includes 7 bits designating the magnitude of the signal and 1 bit indicating the sign of the signal. Three of the remaining 4 bits are for supervisory functions with the remaining bit being an odd parity bit over the entire 12 bit sample.

Each FIU provides for transmitting 193 channels of information to the network portion of the RSU. Two groups of 193 channels comprise an information rail. Therefore, each rail contains 386 channels of information.

The RSU serves up to a maximum of 8 FIUs (1 through 8) of which 4 FIUs (5-8) are dedicated solely to the base unit interface as shown in FIG. 2. The remaining 4 FIUs (1-4) may be a mix of analog line FIUs and digital trunk FIUs in any combination. The analog line FIU serves local subscribers connected to the RSU, whereas the digital trunk FIU may serve either RLUs or MXUs.

FIUs 1-4 are connected to the originating time stage 10 and to the terminating time stage 15 of the network portion of the RSU. Digital tone source 11 provides tones, such as busy and ringing tone to the subscribers via the originating time stage 10 and the terminating time stage 15. Remote clock 12 provides for detecting timing from the digital span interfaces connected between the RSU and the BU, and for distributing these timing signals to the originating time stage 10, the terminating time stage 15, and the local base link switch 13. The local base link switch 13 is connected to the originating time stage 10, the terminating stage 15 and to the digital trunk FIUs 5 through 8 which are in turn connected to the BU.

Cable driver/receiver 14 is connected to local base link switch 13 and provides for interfacing co-located remote switching units.

Local RSU traffic is transmitted via an analog line unit FIU, such as FIU 1, to the originating time stage 10, through the local base link switch 13, through terminating time stage 15 to an analog line FIU, such as FIU 1.

Local to base unit traffic is transmitted from analog line FIU 1 through originating time stage 10, through the local base link switch 13, to a digital trunk FIU, such as FIU 5, to the BU. Base unit to local traffic takes a path through a digital trunk FIU, such as FIU 8, to the local base link switch 13, through the terminating time stage 15 to an analog line unit, such as FIU 1. Remote line units and multiplexers may transmit telephone traffic to the base unit in a similar fashion to that mentioned above for local to base unit and base unit to local traffic. The RLU and MXU are connected to the RSU via a digital trunk FIU, such as FIU 4.

The heart of the processor portion of the RSU is processor 25. Processor 25 is a microprocessor which may be implemented with an Intel 8086 microprocessor device. Intel is a registered trademark of the Intel Corporation. Processor 25, along with memory 27, performs the logical analysis and sequencing of calls through the network portion of the RSU. In addition, processor 25 performs administrative and maintenance functions for the RSU.

A network bus interface 26 connects processor 25 to the network portion of the RSU.

FIU interfaces 20–24 and 30–34 permit processor 25 to control the operation of facility interface units 1–4 and 5–8, respectively. Co-located RSU interface 28 provides processor 25 with the ability to control co-located remote switching unit operation.

Figure 3:
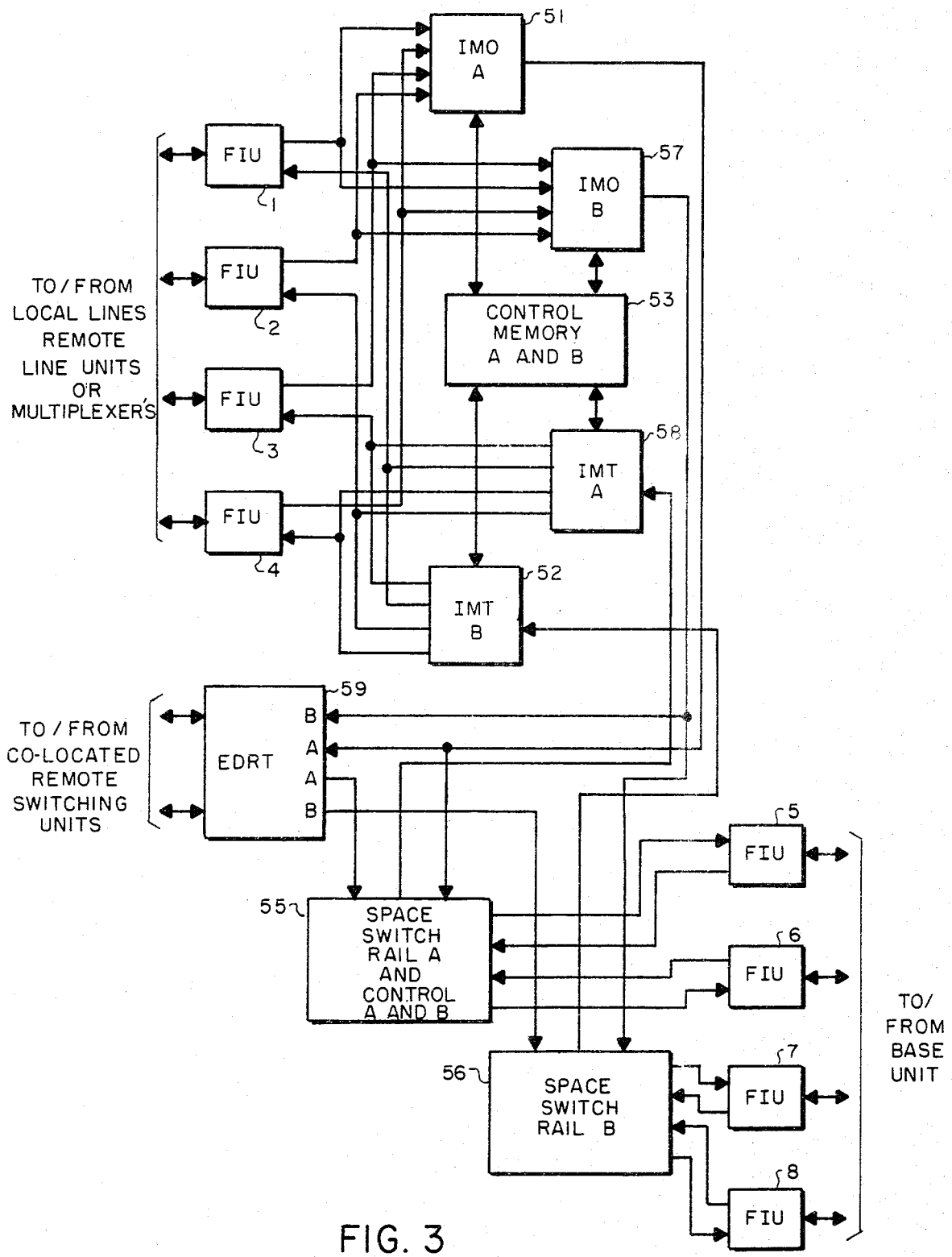
FIG. 3 is a block diagram of the network portion of the remote switching unit of FIG. 2.

Referring to FIG. 3, FIUs 1 and 2 are connected to information memory originating (IMO) 51 and to IMO 57. Information memory originating 51 and 57 collectively comprise an originating time switching stage. FIUs 3 and 4 are connected to information memory terminating 52 and 58. Information memories 52 and 58 collectively comprise a terminating time switching stage. Control memory A and B 53 is connected to the RSU processor and contains switching information for controlling each of the information memories 51, 52, 57 and 58. Each FIU provides for transmitting 193 channels of information to the memory to which it is connected. Two FIUs, or two groups of 193 channels, comprise an information rail. That is, each rail contains 386 channels of information. Each information memory is capable of handling two such rails.

Each information memory is connected to its respective space switch rail A 55 or rail B 56. Space switches 55 and 56 constitute the local base link switch 13 of FIG. 2. Each information memory contains PCM samples representing the amplitude of a voice signal. Twelve bits are required. Eight bits represent the amplitude of the voice signal; three bits are supervisory information; and, one bit is parity. Since each information memory contains two rails of incoming or outgoing information, at least two physical memory units of 386 words are required.

PCM data is transmitted from a local line, an RLU, or an MXU through an FIU, such as FIU 1 through 4, and stored in information IMOA 51 or IMOB 57. The PCM data is then transmitted through space switch 55 for rail A or space switch 56 for rail B.

Next, the data is transmitted from space switch 55 or 56 to IMTA 58 or IMTB 52 where it is stored. At the appropriate time, control memory A and B 53 is written into by a processor of the RSU with the instructions indicating on which time slot the stored PCM sample is to be transmitted outward to one of the FIUs 1 through 4. The FIUs then transmit the PCM sample to either a local line, an RLU or an MXU.

For PCM samples transmitted to the RSU from the base unit, no originating time switching stage is required since these PCM samples have been time switched by the base unit. PCM samples from the base unit are transmitted and received by FIUs 5 through 8. These FIUs are connected to the base unit by digital spans. FIUs 5 and 6 are connected to space switch 55 and FIUs 7 and 8 are connected to space switch 56 and provide for transmitting the received PCM samples from the base unit into the switching network of the RSU.

Space switches 55 and 56 operate to transmit data in one of two directions. The space switches may transmit data from the IMOA 51 or IMOB 57 to the base unit via FIUs 5 through 8 or the space switches may transmit data received from the base unit via FIUs 5 through 8 to IMTA 58 or IMTB 52. PCM information transmitted to IMTA 58 or IMTB 52 will subsequently be transmitted via one of FIUs 1 through 4 to either a local line, an RLU or an MXU.

Information may be transmitted to the RSU from another co-located RSU. This information is received or transmitted by the extended driver/receiver time (EDRT) 59. Information received by the EDRT is transmitted to either space switch 55 or space switch 56. This PCM information is then either transmitted to the appropriate information memory terminating for transmission to a local line, RLU or MXU.

Figure 4A:
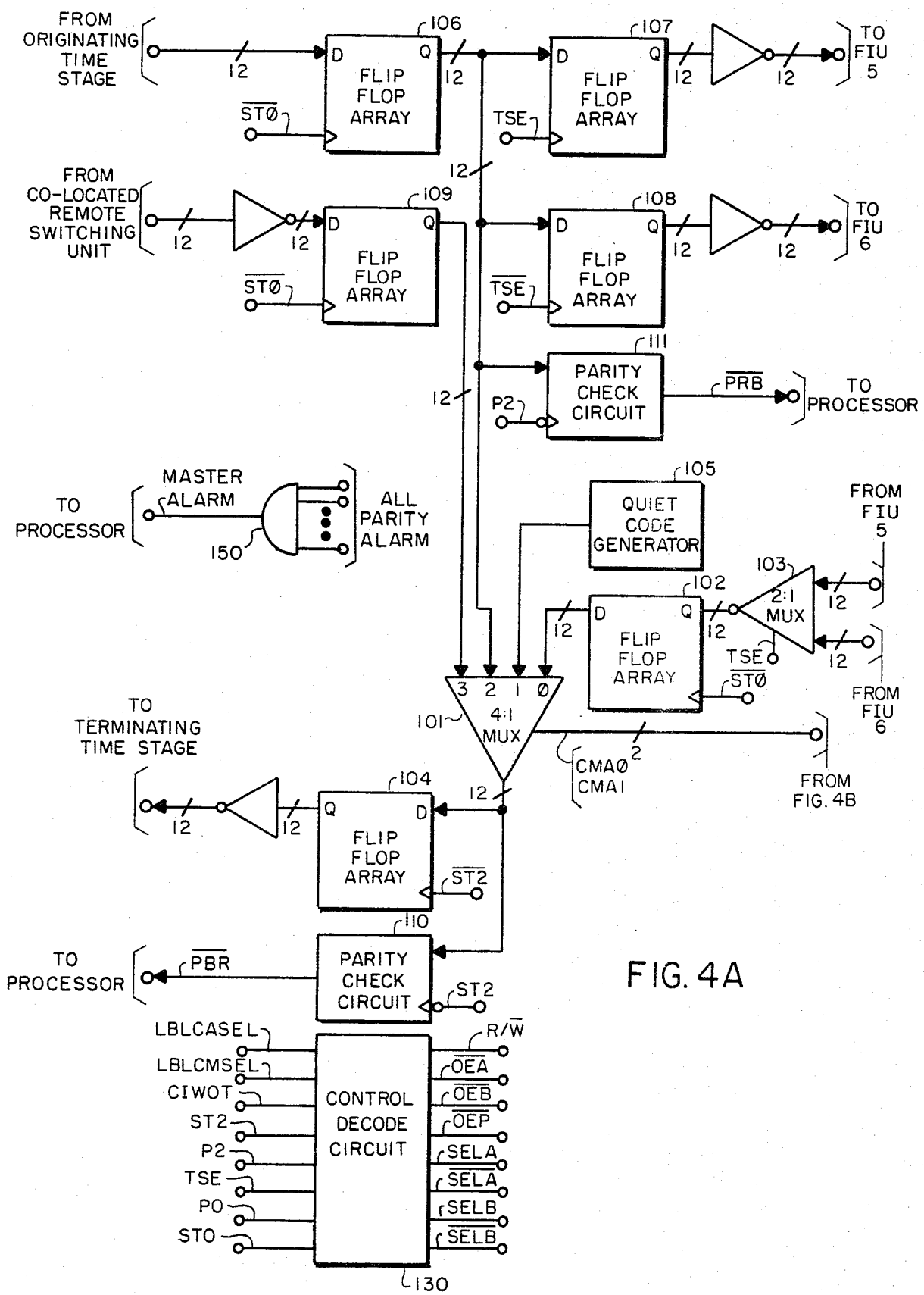
FIG. 4A is a schematic diagram of a portion of the space switch rail A and control A and B as shown in FIG. 3.

Referring to FIGS. 4A and 4B collectively, these figures depict a block diagram of space switch rail A and control A and B 55 of FIG. 3. The rail A space switch 55 of FIG. 3 provides the control function for both space switches 55 and 56 as shown in FIG. 3. FIG. 4A is the network portion of space switch rail A and FIG. 4B is the control portion for both the rail A and rail B space switches 55 and 56.

PCM data on rail A of the RSU network is directed by 4:1 multiplexer 101 between the originating time switching stage and the terminating time switching stage of the RSU. Depending on the two-bit address of control leads CMA0 and CMA1 which are transmitted to multiplexer 101 for each time slot, the multiplexer 101 selects PCM data from one of its four inputs and transmits the data to the terminating time stage. This PCM data is then stored in both copies of information memory terminating, as outlined above. One input to multiplexer 101 is transmitted by flip-flop array 102. Flip-flop array 102 is connected to FIUs 5 and 6 through 2:1 multiplexer 103. The buses connecting each of the components mentioned above are twelve bits in width. Eight bits of these twelve are a PCM voice sample which includes a sign bit, three supervision bits and one odd parity bit. When the TSE lead, which connects multiplexer 103 to the clock, is low (this lead is low on each odd time slot) PCM data from FIU 5 is enabled to be transmitted to the input of multiplexer 101 via flip-flop array 102. When the signal on the TSE lead is high (it is high on all even time slots), PCM data from FIU 6 is enabled to be transmitted to the input of multiplexer 101 via flip-flop array 102. The inverted output signals of multiplexer 103 are latched by flip-flop array 102 on the rising edge of a clock signal on the ST0 lead. When the value of both the CMA0 and CMA1 leads is low, the data latched by flip-flop array 102 is enabled to the output of multiplexer 101. The clock signal on the ST2 lead enables flip-flop array 104 to latch the PCM data output by multiplexer 101. This latched data is then read out of flip-flop array 104 and transmitted to both copies of the information memory terminating of the terminating time switching stage.

A second input to multiplexer 101 is connected to quiet code generator 105. Quiet code is provided for any unused time slots so as to eliminate any PCM line distortion. Quiet code consists of a twelve-bit PCM sample, nine of which are at logic 1 and three of which are at logic 0. This provides an odd parity over the twelve bits which will inhibit the generation of any parity alarms. When the signals on leads CMA0 and CMA1 are respectively at logic 1 and logic 0, the quiet code generator output is gated through multiplexer 101 and latched by flip-flop array 104.

The next input to multiplexer 101 contains PCM data from local RSU subscribers. This PCM data is transmitted from the originating time switching stage of the RSU through flip-flop array 106 to multiplexer 101. The buses connecting the information memory originating to flip-flop array 106 and flip-flop array 106 to multiplexer 101 are also twelve bits in width.

During a particular time slot, if the PCM data latched in flip-flop array 106 is destined for another local RSU subscriber, then the signals on leads CMA0 and CMA1 will be at logic 0 and logic 1 respectively. As a result, multiplexer 101 will enable the contents of flip-flop array 106 to be gated through and latched by flip-flop array 104.

The PCM data latched in flip-flop array 106 is also latched in either flip-flop array 107 or flip-flop array 108. If the signal on the TSE lead is at logic 1 then flip-flop array 107 latches the PCM data. If the signal on TSE lead is at logic 0 then flip-flop array 108 latches the PCM data. Flip-flop array 107 is connected to FIU 5, while flip-flop array 108 is connected to FIU 6. In this manner, the PCM data is segregated for transmission on the even or odd time slots to the base unit. PCM data may be transmitted from a co-located RSU through flip-flop array 109 to multiplexer 101. Flip-flop array 109 latches the twelve-bit wide PCM data. When the signals on both the CMA0 and CMA1 leads are at logic 1, multiplexer 101 operates to gate the PCM data from the co-located RSU through to be latched in flip-flop array 104. This data is then written into the memory of the terminating time switching stage.

Parity checking is performed at two locations in each rail of the network portion of the space switch. First, the output of multiplexer 101 is also transmitted via a twelve-bit wide bus to parity check circuit 110. Parity check circuit 110 is a commercially available unit which is twelve bits wide and which checks for odd parity over the twelve bits. If bad parity is detected, parity check circuit 110 provides a logic 0 output and also latches the PCM data. The PBR lead will go low when bad parity is detected, thereby indicating bad parity on PCM data which is being transmitted to a local RSU subscriber.

Parity is also checked on PCM data transmitted from local RSU subscribers. When PCM data is latched by flip-flop array 106, parity check circuit 111 is operated on the P2 phase of the clock and examines the twelve bits latched by flip-flop array 106. If bad parity is detected, the signal on the PRB lead has the value logic 0, indicating that bad parity has been detected on a PCM data sample transmitted from the originating time switching stage.

The processor is connected to the space switching stage via the twelve-bit address bus CADD and the eight-bit bi-directional data bus. The CADD bus along with the time slot counter bus TSC is connected to multiplexer 121. When the clock lead P2 is at logic 1, the CADD bus is gated through multiplexer 121 and enabled to select an address for memories 122 through 125. During this period, one of memory units 122 through 125 is enabled. This is accomplished by the control decode circuit 130 utilizing the P2 signal and one bit of the address bus CADD (bit 10) to derive the SELA and SELE signals. Bit 9 of the CADD bus selects a particular address within the selected memory. Read/Write control is determined by bit 11 of the CADD bus, that is, logic 0 for a write and logic 1 for a read.

The memory units 122 through 125 are written with the proper information to ensure that multiplexer 101 is operated to gate the proper input through to the terminating time stage during each time slot. During the P0 portion of the network time clock, the memory units 122 through 125 are accessed by the time slot counter leads TSC. The information written into memory units 122 through 125 is then read out upon the occurrence of clock signal ST0. The result is latched in flip-flop array 132 for the rail A space switch and in flip-flop array 134 for the rail B space switch. The signals latched in flip-flop arrays 132 and 134 contain the information required to operate multiplexer 101. That is, the signals are the CMA0 and CMA1 leads required to operate multiplexer 101 to gate the appropriate input through to the terminating time stage as outlined above. Flip-flop array 134 contains the CMB0 and CMB1 leads required to operate the corresponding multiplexer 201 in the rail B space switch.

Flip-flop arrays 133 and 135 permit the stored multiplexer control information to be read back via the eight-bit bi-directional data bus to the processor.

Parity check circuits 143 and 144 respectively check for odd parity over the time slot counter TSC bus and the processor address bus CADD. If bad parity is detected by parity check circuits 143 or 144, a logic 0 signal is provided on the PTSC or PAD leads respectively. Parity is also checked over the buses which operate multiplexer 101 and the corresponding multiplexer 201 in the rail B space switch. Parity check circuits 141 and 142 operate to check these two buses respectively. If bad parity is detected, a logic 0 signal is generated on the PMA lead by parity check circuit 141 or on the PMB lead by parity check circuit 142.

All of the above mentioned parity check circuits search for odd parity. If even parity is detected, the parity check circuit latches and remains set until reset by the processor. All parity alarm signals are ORed by AND gate 150 which transmits a master alarm signal to the processor. The processor may then address the alarm read logic 151 via the BLSFPE and BLSFPO leads and read the status of each of the parity alarms via the eight-bit bi-directional data bus via alarm read logic 151. In addition, the processor may set the alarm latches individually via the alarm set decode 152 utilizing the eight-bit bi-directional bus. In this way, the processor may detect a stuck or a not settable alarm latch in the alarm read logic 151.

Figure 4C:
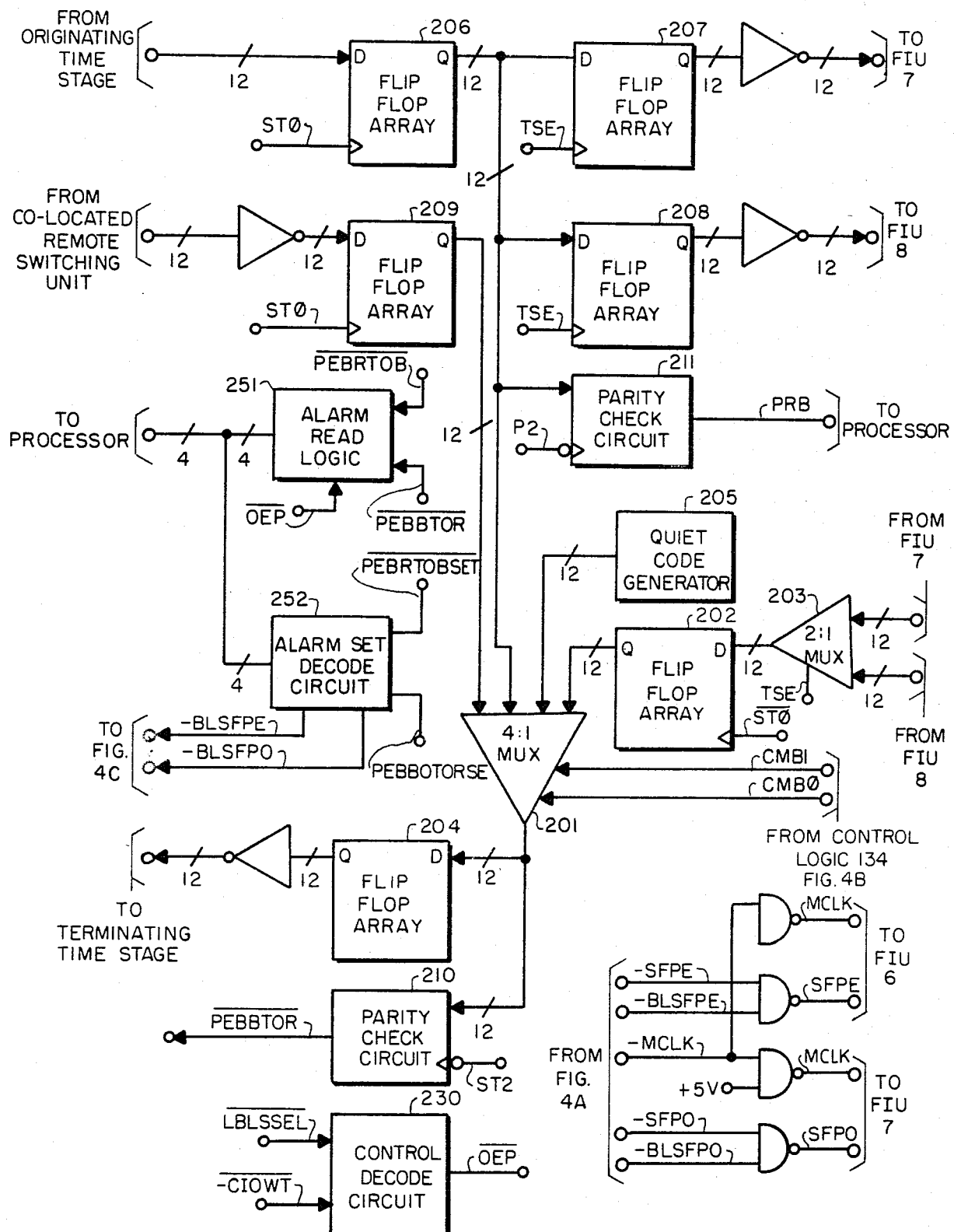
FIG. 4C is a schematic diagram of the space switch rail B of FIG. 3.

Referring to FIG. 4C, a block diagram of the space switch rail B 56 of FIG. 3 is depicted. This diagram is the network portion of the rail B space switch. The logic shown in FIG. 4B provides the control function for the rail B space switch.

PCM data on rail B of the RSU network is directed by 4:1 multiplexer 201 between the originating time switching stage and the terminating time switching stage of the RSU. Depending upon the two-bit address of control leads CMB0 and CMB1 transmitted by flip-flop array 134 of FIG. 4B, multiplexer 201 selects PCM data from one of its four inputs and transmits the data to the terminating time switching stage via a flip-flop array 204. That is, the values for signals CMB0 and CMB1 are transmitted to multiplexer 201 for each time slot.

Multiplexer 201 is connected to flip-flop array 202 and constitutes one input to multiplexer 201. Flip-flop array 202 is connected to FIUs 7 and 8 via 2:1 multiplexer 203. Multiplexer 203 is also connected to flip-flop array 202. The buses which connect each of the above mentioned components are twelve bits in width. When the TSE lead, which connects multiplexer 203 to the clock, is low (this lead is low on each odd time slot), PCM data from FIU 7 is enabled to be transmitted through multiplexer 203 and latched by flip-flop array 202, so that; the latched values of flip-flop array 202 are available at the input of multiplexer 201. When the signal on the TSE lead is high (it is high on all even time slots), PCM data from FIU 8 is enabled to be transmitted through multiplexer 203 and be latched by flip-flop array 202, so that, the PCM data is available at the input to multiplexer 201. The inverted output signals of multiplexer 203 are latched by flip-flop array 202 on the rising edge of a clock signal on the ST0 lead. When the value of both the CMB0 and CMB1 leads is low, the data latched by flip-flop array 202 is enabled through multiplexer 201 to its output. When clock signal ST2 is low, flip-flop array 204 is enabled to latch the PCM data output by multiplexer 201. This latched PCM data is then read out of flip-flop array 204 and transmitted to both copies of the information memory terminating of the terminating time switching stage.

Multiplexer 201 is connected to a second input source, quiet code generator 205. Quiet code is provided for any unused time slots so as to eliminate any PCM line distortion. Quiet code consists of a twelve-bit PCM sample, nine bits of which are at logic 1 and three bits of which are logic 0. This provides an odd parity over the twelve bits, which will inhibit the generation of any parity alarms. When the signals on leads CMB0 and CMB1 are respectively at logic 1 and logic 0, the quiet code generator 205 has its output gated through multiplexer 201 and is latched by flip-flop array 204.

The next input to multiplexer 201 constitutes PCM data from local RSU subscribers. Flip-flop array 206 is connected between multiplexer 201 and the originating time stage. This PCM data is transmitted from the originating time switching stage of the RSU through flip-flop array 206 to multiplexer 201. The buses connecting the information memory originating to flip-flop 206 and connecting flip-flop 206 to multiplexer 201 are twelve bits in width.

During a particular time slot, if the PCM data latch by flip-flop array 206 is destined for another local RSU subscriber, then the signals on leads CMB0 and CMB1 will be at logic 0 and logic 1 respectively. As a result, multiplexer 201 will enable contents of flip-flop array 206 to be gated through and latched by flip-flop array 204.

The PCM data latched in flip-flop array 206 is also latched in either flip-flop array 207 or flip-flop array 208. If the signal on the TSE lead is at logic 1, then flip-flop array 207 latches the PCM data, which is subsequently transmitted to FIU 7. If the signal on the TSE lead is at logic 0 then flip-flop array 208 latches the PCM data which is subsequently transmitted to FIU 8. Flip-flop array 207 is connected to FIU 7, while flip-flop array 208 is connected to FIU 8. In this manner, the PCM data is segregated for transmission on the even or odd time slots to the base unit.

PCM data may be transmitted from a co-located RSU through flip-flop array 209 to multiplexer 201. Flip-flop array 209, which is connected between the originating time stage and multiplexer 201, latches the twelve-bit wide PCM data. When the signals on both the CMB0 and CMB1 leads are at logic 1, multiplexer 201 operates to gate the PCM data from the co-located RSU through to be latched in flip-flop array 204. This data is then written into the information memory terminating of the terminating time stage as outlined above.

Multiplexer 201 is connected to parity check circuit 210 and parity check circuit 210 receives the PCM data which is being transmitted to the terminating time stage. The bus connecting multiplexer 201 to parity check circuit 210 is twelve bits wide. Parity check circuit 210 is a commercially available unit which checks for odd parity over the twelve bits input. If bad parity is detected, parity check circuit 210 provides a logic 0 output on the PEBBTOR lead and also latches the PCM data. This indicates that bad parity was detected on PCM data which is being transmitted to a local RSU subscriber. The processor may then examine the bad parity data.

Parity is also checked on PCM data being transmitted from local RSU subscribers. When PCM data is latched by flip-flop 206, parity check circuit 211 is operated on the P2 lead of that phase of the clock and examines the twelve bits latched by flip-flop array 206. If bad parity is detected, a signal on the PEBRTOB lead has the value of logic 0, indicating that bad parity has been detected on a PCM data sample being transmitted from the originating time switching stage.

Parity check circuits 210 and 211 are connected to alarm read logic 251, which is connected to the processor via four bits of the bi-directional data bus. This informs the processor of the source of any bad parity. In addition, the processor is able to check the alarm read logic 251. Alarm set decode 252 is also connected to the processor via the bi-directional bus. Therefore, the processor is able to set the PEBRTOB and PEBBTOR parity alarm leads to determine the integrity of alarm read logic 251. A logic 1 on bit 0 of the bi-directional data bus indicates that the PEBBTOR signal is to be set and a logic 1 on bit 1 of the bus indicates that the PEBRTOB lead is to be set.

Control decode circuit 253 is connected between the clock and alarm read logic 251. In response to the LBLSSEL and CIOWT signals from the clock control decode circuit 253 generates the OEP signal, which when at logic 0 enables the reading of the parity check circuits 210 and 211 by the processor.

Figure 5:
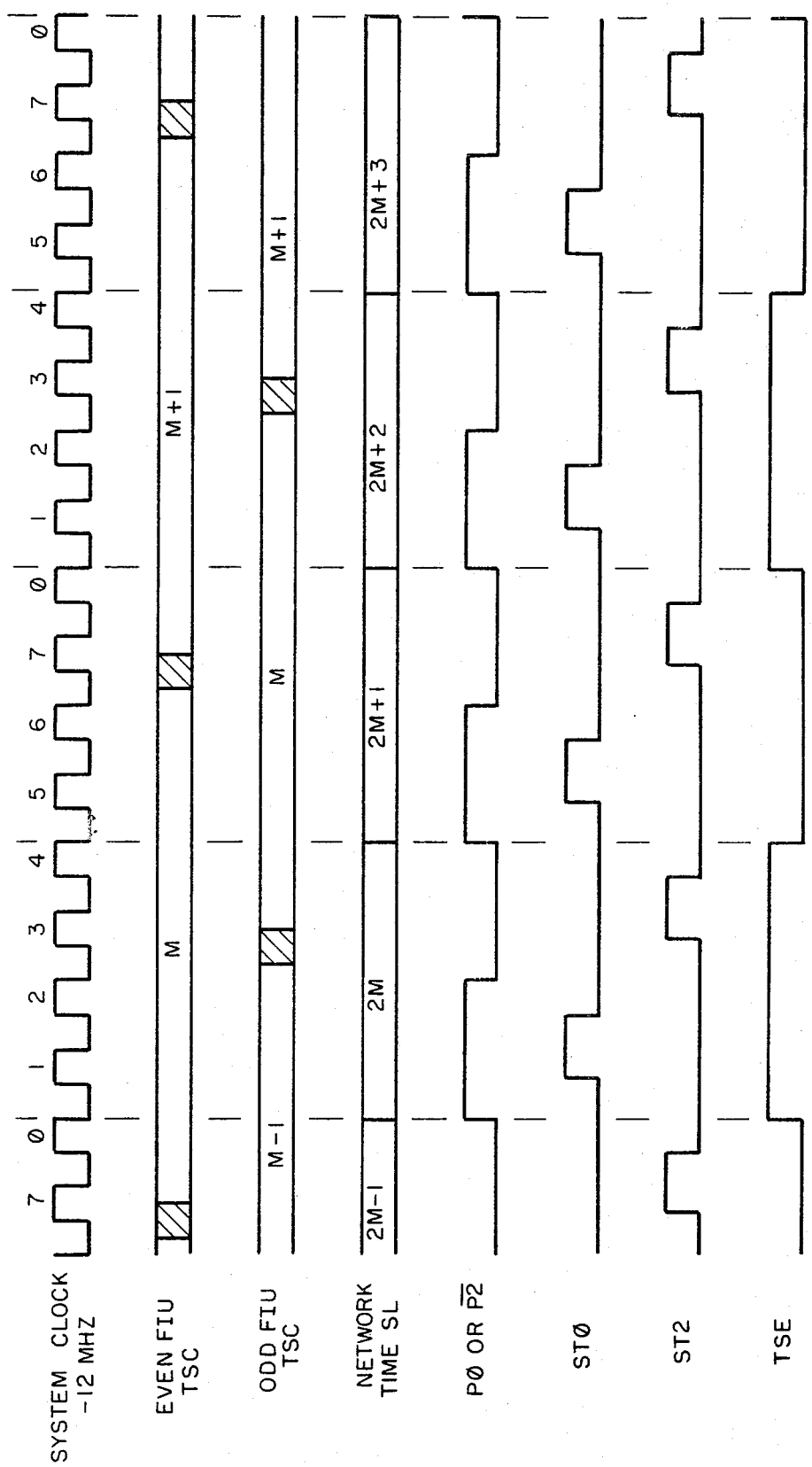
FIG. 5 is a timing diagram of required signals for the space switches of the remote switching unit.

FIG. 5 is a timing diagram of various clock signals produced by the remote clock 12 of the RSU in order to operate the local base link switch 13 as shown above.

It is to be understood that the RSU operation has been shown in simplex form but, with appropriate synchronizing circuitry may be operated as two synchronous duplex copies for reliability.

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. In a telecommunications system, a parity checking arrangement for a remote switching unit, which is connected between subscribers and other switching systems via a plurality of interface equipment, said parity checking arrangement for said remote switching unit comprising:

first and second PCM buses connected to said subscribers via said interface equipment for transmitting a plurality of PCM data samples, each including a parity bit;

third and fourth PCM buses connected to said other switching systems via said interface equipment for transmitting a plurality of PCM data samples, each including a parity bit;

digital span means connected between said plurality of interface equipment and said other switching system and being operated to transmit said PCM data between said remote switching unit and said other switching systems;

first and second originating time switching means, each of said originating time switching means being operated to switch said PCM samples from said interface equipment, said first and second originating time switching means being connected to said interface equipment via said first and second buses respectively;

first and second space switching means, each including:
  first latching means connected to said corresponding first and second originating time switching means, said first latching means operated in response to said subsequently transmitted PCM samples to store said PCM sample during each time slot;
  first multiplexing means connected to said first latching means and operated to transmit said stored PCM samples during each time slot in response to first and second operating signals of first predefined values; and
  second latching means connected to said first multiplexing means and being operated to store said PCM samples transmitted through said first multiplexing means during each said time slot;
  selecting means connected to said first multiplexing means, to said first latching means, and to said interface equipment via said third and fourth PCM buses, said selecting means being operated to receive and to transmit said PCM data samples from said other switching systems during each said time slot;
  said first multiplexing means being further operated, in response to said received PCM data samples of said other switching systems, to transmit said received PCM samples during time slots in response to said first and second operating signals of second predefined values;
  said selecting means being further operated in response to said stored PCM samples of said first latching means to transmit said stored PCM samples to said interface equipment via said third and fourth PCM buses for transmission through said digital span means;
  first parity checking means connected between said first latching means and said first multiplexing means, between said first multiplexing means and said second latching means, said parity checking means being operated in response to said transmitted parity bit of each said PCM samples to determine whether said parity bit of each said PCM sample is a correct value;
  said first parity checking means being further operated to generate a plurality of first bad parity signals for a detection of an incorrect parity bit of any PCM sample; and
  said first parity checking means being further operated to store said PCM sample having an incorrect parity bit; and said remote switching unit further comprising:

first and second terminating time switching means being connected respectively between said first and said second space switching means via said second latching means and said interface equipment, said first and second terminating time switching means respectively operated to switch said PCM samples from said first and second space switching means to said interface equipment for transmission to said subscribers.

2. A parity checking arrangement for a remote switching unit as claimed in claim 1, wherein there is included a clock for producing a plurality of periodic pulses for operating said originating time switching means, said terminating time switching means, said first and second latching means, said first multiplexing means, said first parity checking means and said selecting means of said space switching means, said clock being connected to said originating time switching means, to said terminating time switching means, to said first and second latching means, to said first multiplexing means, to said first parity checking means and to said selecting means of said space switching means.

3. A parity checking arrangement for a remote switching unit as claimed in claim 2, wherein there is further included digital tone generation means connected to said originating and said terminating time switching means, said digital tone generation means being operated to generate a plurality of digital tones.

4. A parity checking arrangement for a remote switching unit as claimed in claim 3, wherein there is further included driver/receiver means connected between said space switching means and a second remote switching unit.

5. A parity checking arrangement for a remote switching unit as claimed in claim 4, wherein there is further included processor system means connected to said clock, to said tone generation means, to said driver/receiver means, to said originating and terminating time switching means and to said space switching means for controlling said operation of said tone generation means, said driver/receiver means, said originating time switching means, said terminating time switching means and said space switching means.

6. A parity checking arrangement for a remote switching unit as claimed in claim 5, said processor system means including a central processing unit (CPU).

7. A parity checking arrangement for a remote switching unit as claimed in claim 6, said processor system means including bus interface means, said bus interface means being connected between said CPU and said clock, said digital tone generation means, said driver/receiver means, said originating time switching means, said terminating time switching means and said space switching means.

8. A parity checking arrangement for a remote switching unit as claimed in claim 6, said CPU including a microprocessor.

9. A parity checking arrangement for a remote switching unit as claimed in claim 6, said processor system means further including memory means connected to said CPU and being operated to store program instruction and data under control of said CPU.

10. A parity checking arrangement for a remote switching unit as claimed in claim 6, said processor system means further including control means connected between said CPU and said second remote switching unit, said control means being operated to monitor said PCM data transmitted between said second remote switching unit and said one remote switching unit.

11. A parity checking arrangement for a remote switching unit as claimed in claim 6, said processor system means further including a plurality control interface equipment means, each particular control interface equipment means connected to said CPU and to one corresponding interface equipment.

12. A parity checking arrangement for a remote switching unit as claimed in claim 10, wherein there is further included decoding means connected to said CPU, to said clock and to said first and second space switching means, said decoding means being operated in response to said plurality of periodic pulses to produce a plurality of logic signals for operating said first and second space switching means.

13. A parity checking arrangement for a remote switching unit as claimed in claim 12, said selecting means of said first space switching means including:
  second multiplexing means connected to a first and a second interface equipment and to said clock, said second multiplexing means being operated to transmit said PCM samples from said first or alternatively from said second interface equipment; and
  third latching means connected to said clock, to said second multiplexing means and to said first multiplexing means of said first space switching means, said third latching means being operated in response to said second multiplexing means to store said transmitted PCM samples of said first interface equipment or alternatively said third latching means being operated in response to said second multiplexing means to store said transmitted PCM samples of said second interface equipment.

14. A parity checking arrangement for a remote switching unit as claimed in claim 12, said selecting means of said second space switching means including:
  third multiplexing means connected to a third and to a fourth interface equipment and to said clock, said third multiplexing means being operated to transmit said PCM samples from said third or alternatively from said fourth interface equipment; and
  fourth latching means connected to said clock, to said third multiplexing means and to said first multiplexing means of said second space switching means, said fourth latching means being operated in response to said third multiplexing means to store said transmitted PCM samples of said third multiplexing means from said third interface equipment or alternatively said fourth latching means being operated in response to said third multiplexing means to store said transmitted PCM samples of said third multiplexing means from said fourth interface equipment.

15. A parity checking arrangement for a remote switching unit as claimed in claim 1, wherein there is further included means for generating a predetermined data pattern, said means for generating connected to said first multiplexing means of said first and said second space switching means, said means for generating being operated to produce said predetermined data pattern for each unused time slot.

16. A parity checking arrangement for a remote switching unit as claimed in claim 10, wherein there is further included fifth latching means connected to said clock, to said second remote switching unit and to said first multiplexing means of said first space switching means, said fifth latching means being operated to store said PCM samples transmitted from said second remote switching unit to said one remote switching unit.

17. A parity checking arrangement for a remote switching unit as claimed in claim 10, wherein there is further included sixth latching means connected to said second remote switching unit, to said clock and to said first multiplexing means of said second space switching means, said sixth latching means being operated to store said PCM samples transmitted from said second remote switching unit to said one remote switching unit.

18. A parity checking arrangement for a remote switching unit as claimed in claim 13, said first space switching means further includes seventh latching means connected to said first latching means of said first space switching means, to said first and second interface equipment and to said clock, said seventh latching means being operated to store said PCM samples for transmission to said first and second interface equipment.

19. A parity checking arrangement for a remote switching unit as claimed in claim 14, said second space switching means further includes eighth latching means connected to said first latching means of said second space switching means, to said third and fourth interface equipment and to said clock, said eighth latching means being operated to store said PCM samples for transmission to said third and fourth interface equipment.

20. A parity checking arrangement for a remote switching unit as claimed in claim 12, wherein there is further included time slot sequencing means connected to said decoding means, to said CPU, to said clock and to said first multiplexing means of each of said space switching means, said time slot sequencing means being operated to operate said first multiplexing means of each said space switching means during each said time slot via said first and second operating signals.

21. A parity checking arrangement for a remote switching unit as claimed in claim 20, said time slot sequencing means including memory means connected to said CPU, to said clock and to said decoding means, said memory means being operated in response to said logic signals to store control data for operating said first multiplexing means of said first and second space switching means during each said time slot via said first and second operating signals.

22. A parity checking arrangement for a remote switching unit as claimed in claim 21, said time slot sequencing means further including ninth latching means connected to said memory means, to said CPU, to said clock and to said first multiplexing means of said first and second space switching means, said ninth latching means being operated to transmit said stored operating signals to said first multiplexing means of each said space switching means and to said CPU.

23. A parity checking arrangement for a remote switching unit as claimed in claim 22, said connection of said ninth latching means to each said first multiplexing means including a distinct two-bit bus for transmitting said operating signals to said first multiplexing means of each said space switching means.

24. A parity checking arrangement for a remote switching unit as claimed in claim 23, wherein said connection of said memory means to said clock and to said CPU includes fourth multiplexing means connected to said memory means, to said clock and to said CPU, said fourth multiplexing means being operated in response to said clock to connect said CPU to said memory means or alternatively to connect said clock to memory means.

25. A parity checking arrangement for a remote switching unit as claimed in claim 24, wherein there is further included:
    second parity checking means connected between said fourth multiplexing means and said clock and between said fourth multiplexing means and said CPU, said second parity checking means being operated in response to data transmitted from said CPU and said clock to determine whether a parity bit associated with each said data is correct;
    said second parity checking means being further operated to generate a plurality of second bad parity signals for a detection of incorrect parity bits of said data; and
    said second parity checking means being further operated to store said data having an incorrect parity bit.

26. A parity checking arrangement for a remote switching unit as claimed in claim 25, wherein there is further included:
    third parity checking means connected between said ninth latching means and said first multiplexing means of each said space switching means, said third parity checking means being operated in response to said transmitted operating signals to determine whether a parity bit associated with said operating signals is correct;
    said third parity checking means being further operated to generate a plurality of third bad parity signals for said detection of incorrect parity bits of said operating signals; and
    said third parity checking means being further operated to store the values of said operating signals having an incorrect parity bit.

27. A parity checking arrangement for a remote switching unit as claimed in claim 26, wherein said first and second space switching means each further include parity alarm means connected to said first, said second and said third parity checking means and to said CPU, said parity alarm means being operated in response to said first, second and third pluralities of bad parity signals to transmit an alarm signal to said CPU.

28. A parity checking arrangement for a remote switching unit as claimed in claim 27, said parity alarm means of said first space switching means including first means for transmitting connected to said first, said second and said third parity checking means and to said CPU, said first means for transmitting being operated to selectively transmit a value for each of said first, second and third pluralities of said bad parity signals to said CPU.

29. A parity checking arrangement for a remote switching unit as claimed in claim 28, said parity alarm means of said first space switching means further including first means for testing connected to said first means for transmitting, to said clock, to said decoding means and to said CPU, said first means for testing being operated in response to said CPU, to said first parity checking means of said first space switching means, in response to said second parity checking means and in response to said third parity checking means to activate said first, said second and said third pluralities of bad parity signals.

30. A parity checking arrangement for a remote switching unit as claimed in claim 27, said parity alarm means of said second space switching means including second means for transmitting connected to said first parity checking means of said second space switching means and to said CPU, said first means for transmitting being operated to selectively transmit a value for said first pluralities of said bad parity signals of said second space switching means to said CPU.

31. A parity checking arrangement for a remote switching unit as claimed in claim 30, said parity alarm means of said second space switching means further including second means for testing connected to said second means for transmitting, to said clock, to said decoding means and to said CPU, said second means for testing being operated in response to said CPU and to said first parity checking means of said first space switching means to activate said first plurality of bad parity signals of said first parity checking means of said second space switching means.

* * * * *